United States Patent
Grigoropoulos et al.

(10) Patent No.: US 12,284,716 B2
(45) Date of Patent: Apr. 22, 2025

(54) METHOD AND SYSTEM FOR AUTOMATICALLY PRIORITIZING EMERGENCY CALLS BASED ON HEALTH DATA

(71) Applicant: ATOS Public Safety, LLC, Irving, TX (US)

(72) Inventors: Charalampos Grigoropoulos, Chalandri (GR); Manfred Kehr, Munich (DE); Nikolaos Ploumitsakos, Maroussi (GR); Michail Sdrallis, Chalandri (GR); Konstantia Markantoni, Metamorfosi (GR)

(73) Assignee: ATOS PUBLIC SAFETY, LLC, Irving, TX (US)

( * ) Notice: Subject to any disclaimer, the term of this patent is extended or adjusted under 35 U.S.C. 154(b) by 435 days.

(21) Appl. No.: 17/941,133

(22) Filed: Sep. 9, 2022

(65) Prior Publication Data
US 2023/0225009 A1   Jul. 13, 2023

(30) Foreign Application Priority Data
Jan. 13, 2022   (EP) .................................. 22151431

(51) Int. Cl.
*H04W 76/10*   (2018.01)
*H04W 72/56*   (2023.01)
*H04W 76/50*   (2018.01)

(52) U.S. Cl.
CPC ............ *H04W 76/50* (2018.02); *H04W 72/56* (2023.01); *H04W 76/10* (2018.02)

(58) Field of Classification Search
CPC ....................................................... H04W 76/10
USPC .......................................................... 370/329
See application file for complete search history.

(56) References Cited

U.S. PATENT DOCUMENTS

| | | |
|---|---|---|
| 2015/0229775 A1 | 8/2015 | Kamboh et al. |
| 2017/0238129 A1 | 8/2017 | Maier et al. |
| 2019/0174289 A1 | 6/2019 | Martin et al. |

OTHER PUBLICATIONS

Extended European Search Report for European Application No. 22151431.8 dated Jun. 8, 2022.

*Primary Examiner* — Angel T Brockman
(74) *Attorney, Agent, or Firm* — MEAGHER EMANUEL LAKS GOLDBERG & LIAO, LLP

(57) ABSTRACT

A method and a system can automatically prioritize emergency calls based on health data. Such prioritization can be provided even when the call is placed by a person who has no idea of what has happened in the incident and cannot give many details about the health status of the parties involved.

15 Claims, 7 Drawing Sheets

METHOD AND SYSTEM FOR AUTOMATICALLY PRIORITIZING EMERGENCY CALLS BASED ON HEALTH DATA

CROSS-REFERENCE TO RELATED APPLICATIONS

The present application claims priority to European Patent Application No. EP 22 151 431.8 filed on Jan. 13, 2022. The entirety of this European Patent application is incorporated by reference herein.

FIELD

The present invention relates to a method and a system for automatically prioritizing emergency calls based on health data. Embodiments can be configured to enable automatic emergency call prioritization when the call is placed by a person who has no idea of what has happened in the incident and cannot give many details about the health status of the parties involved.

BACKGROUND

At the time of an emergency call and prior to the call being answered by the agents of a Public Safety Answering Point (PSAP), these agents, as well as the computer servers routing the calls, do not know the importance of each event. There are various studies available that focus on minimizing the waiting time to a call center, most of them using an Interactive Voice Response (IVR) system.

SUMMARY

We determined that if the importance of a particular emergency event associated with one or more calls made to a PSAP could be known, then incidents involving a serious injury that can be lethal could be prioritized. However, none of the methods described in the prior art prioritize the calls based on health data stored in a cloud server (cs) after a call is made by a third party and not from a person involved in the actual incident.

We provide embodiments of a method and a corresponding system that can be configured to automatically prioritize emergency calls based on health data. In some embodiments, capabilities of smart devices and cloud databases can be utilized to provide appropriate routing under circumstances where serious injuries or something that can be fatal has taken place.

A method for automatically prioritizing emergency calls based on health data can include receiving an emergency call, by an Emergency Service Routing Proxy (ESRP) from a caller who is not involved in an emergency incident for which the caller places the emergency call; retrieving, by the ESRP, the location information of the call; forwarding, by the ESRP, the call with the location information retrieved to a Public Service Answering Point, PSAP; queueing, by the PSAP, the emergency call into a queue; querying, by the PSAP, a cloud database server with stored health status data of people who wear a smart device configured to monitor this data by using the location information of the call; prioritizing, by the PSAP, the emergency call in case abnormal health status data within the location of the call has been found from the query.

It can be assumed in many cases that a call for an event is placed by someone that has not been involved in the actual incident and does not have the full picture of what has happened. For example, the caller is not aware of possible injuries, the number of people involved, etc. That person or caller could be a pedestrian looking at smoke or flames coming out of an apartment. Or the caller is in a vehicle passing a car accident that has just happened or any other similar case. It is further assumed that the people involved in the incident are wearing smart devices like smart watches that are advanced enough to be used as medical devices. Some devices have the ability to independently make emergency calls, but this could be turned off. Some devices only measure and transmit data but have no ability to evaluate the data. Some cloud services do not provide any functions for evaluating the data and identifying an emergency from it. Sometimes the data of the device is not sufficient, by itself, to recognize an emergency.

Data from such smart devices, e.g. smart watches, worn by people in the incident area are stored in a cloud server that is only used to collect emergency data. This cloud server may be common for all emergency incidents and services in a country. In cases like a car accident, the pulse of one of the people involved and injured may be abnormally low, or the temperature can be very high (e.g. if a person sits next to a fire, etc.). That kind of data is picked by the medical device (e.g. a smart watch, smart phone, smart speaker, smart device, etc.) and is logged into the common cloud emergency space.

Ae mobile network can correspond to a cellular network where the mobile operator using its 4G and 5G abilities connects the device to the cloud server (cs) so that data can get collected.

Information in form of any medical data or any personal data which is uploaded into the cloud space can be encrypted and secured by certain encryption and security mechanisms. However, the emergency services employees can have access to this data to ensure privacy and country specific GDPR (General Data Protection Regulation) regulations.

Data can be sent to the cloud server at the time something abnormal is identified from the smart medical device. This can help ensure that only emergency-useful information (aggregated data) will be stored in the server and will make filtering faster and more precise. For example, when low pulse is recognized then the location of the health device user and the 'issue' will be registered in the server. It should be mentioned that nowadays with 5G networks the ability to find location coordinates has an accuracy of approximately 1 m.

In a further embodiment, manufacturer-specific cloud storage can also be supported. If such a cloud storage does not deliver the aggregated data (meaning the device/cloud storage does not have the functionality), the cloud server or the PSAP will retrieve the related raw data, evaluate this data and identify an emergency from it.

According to a preferred embodiment, the step of prioritizing further comprises assigning, by the PSAP or the cloud server, a prioritization value to the emergency call.

It should be appreciated that the PSAP is a type of telecommunication device that can include a processor connected to non-transitory computer readable medium (e.g. a non-transitory memory) and at least one transceiver unit. The cloud server can also be a type of telecommunication device that can include a processor connected to non-transitory computer readable medium (e.g. a non-transitory memory) and at least one transceiver unit. The PSAP and/or cloud server can also include at least one input device, at least one output device and/or at least one input/output device. Examples of such devices can include touch screens, printers, keyboards, buttons, or pointer devices. The PSAP and cloud server can also each be configured to form communicative connections with other devices (e.g. agent computer devices, cloud service devices) and the PSAP and the cloud server can also be communicatively connectable (e.g. via a network connection, an internet connection, etc.). In some embodiments, the PSAP can directly control and manage a call queue and in other situations the PSAP can be communicatively connected to a call server that may control and manage a call queue.

According to another preferred embodiment, the prioritization value can be or include a number value between 0.00 and 1.00 which is "1.00" if abnormal health status data has been found and "0" if no abnormal health status data has been found. In other situations, the prioritization value could use other type of numerical value indicators (e.g. a "0" to indicate abnormal health and a "1" or other number to indicate no abnormal health).

Further, according to a preferred embodiment, Computer-supported telecommunications applications (CSTA) messages are used to propagate the prioritization value entry from the cloud database server to the PSAP and/or the PSAP agents.

According to yet another preferred embodiment, a list of prioritization value (related to all found abnormal health status) can be used/presented by PSAP and/or the PSAP agents.

According to yet another preferred embodiment, based on a list of prioritization values related to all found abnormal health status a single prioritization value can be determined and used/presented by PSAP and/or the PSAP agents.

According to yet another preferred embodiment, based on the prioritization value the emergency call prioritization can be raised.

According to yet another preferred embodiment, the smart device is one of a smart watch, a smart wristband, an earphone, a smartphone, a smart headband, smart glasses, smart finger clip, a microcontroller with a sensor to measure health-related data and/or a tablet or other devices with the ability to measure, collect and/or transmit the health-related data.

According to yet another preferred embodiment, the readings (e.g. health data) of the smart device may be slightly different between different device types and models. There are many studies available that prove heart rate straps as the most efficient for heart rate (HR) activity tracking. Furthermore, the same studies provide the accuracy of the different smart device models available. As a result, a precision index can be be set next to the health data stored. The following table 1 shows examples of the precision index. This index can be used to determine the prioritization value (ps) when prioritizing the call.

TABLE 1 exemplary example of a precision index

| HR tracking device | Precision Index |
|---|---|
| Smart device combined with a strap | 1.00 |
| Apple devices | 0.99 |
| Garmin devices | 0.98 |
| Fitbit devices | 0.97 |

According to yet another preferred embodiment the prioritization value can be set to 1.00, if at least one abnormal health status is found or at least one prioritization value of a list of prioritization values is above a certain threshold (e.g. 0.90, 0.95, etc.).

According to yet another preferred embodiment based on a list of prioritization values related to all found abnormal health status a single prioritization value can be determined as follows:

$$\text{single prioritization value}(ps) == \frac{1}{n}\sum_{i=0}^{n} ps_i$$

According to yet another preferred embodiment based on a list of prioritization values (ps) (related to all abnormal health statuses found) a single prioritization value (ps) is determined using precision index (pi) as follows:

$$\text{single prioritization value}(ps) == \frac{1}{n}\sum_{i=0}^{n} ps_i * pi_i$$

According to yet another preferred embodiment the emergency call prioritization will be raised if the prioritization value (ps) is above a certain threshold (e.g. 0.90, 0.95, etc.).

According to another preferred embodiment, the retrieving the local information of the caller can include requesting, by the ESRP, the location information for a Location Information Server, LIS, using a POST HTTP message; confirming, by the LIS, the request to the ESRP with a 200 OK message; requesting, by the ESRP, a service from a Location-to-Service Translation, LoST, server for the location information; and forwarding, by the ESRP, the emergency call and the location information obtained by the LoST server using a Presence Information Data Format-Location Object, PIDF-LO to a PSAP or another ESRP.

According to still another preferred embodiment, the step of querying the cloud database further comprises, filtering, by the PSAP and/or the cloud server (cs), the data entries for an area with radius r based on the location of the caller.

Further, according to a preferred embodiment, the radius r can depend on the emergency incident typeset. However, the size of the radius can be adjusted according to the actual incident type and/or the geolocation or the terrain in which the incident occurred. The reason for doing so can be to make sure that potential location discovery accuracy issues are considered and to help ensure that the person performing the emergency call is really near the incident and not far away which may lead to a false detection of the incident this person is calling for. For example, the radius should be larger if the caller is in an open terrain without urban structures and reports an incident, for example, smoke from a fire. On the other hand, the radius should be smaller if the caller is in a city and reports a traffic accident as an incident. For this reason, table 2 shows some examples of the radius having the following default values according to example incident typesets.

TABLE 2 exemplary radius settings for different incident types

| Incident Type | Radius Value (m) | Reasoning |
|---|---|---|
| Car accident | 15 | It is assumed that the person injured could not have gone very far from the accident site. |

TABLE 2-continued exemplary radius settings for different incident types

| Incident Type | Radius Value (m) | Reasoning |
|---|---|---|
| Fire | 30 | The ones wounded may have gone outside and away from the building to avoid further damage |
| Shooting | 500 | Assuming the victims are running away |

According to yet another preferred embodiment, the step of querying the cloud database further comprises filtering, by the PSAP and/or the cloud server (cs), the abnormal health status data entries based on the location of the caller wherein the abnormal health status data in the cloud server (cs) outside the radius r are additionally checked by the PSAP and/or the cloud server (cs) but are assigned with a lower prioritization value (ps). Thereby, it is assumed that for radius r numbers greater than the above values depicted in table 2 the confidence value is reduced to e.g. 70%. This influences the emergency call priority value (ps) as it is reduced by 7/10ths. Such adjustments or filtering can be different for different embodiments based on the predefined confidence values or filtering settings.

According to yet another preferred embodiment, the emergency call can originate from a Legacy Network passing a Legacy Network Gateway, LNG, and can be received from a Next Generation Core Services (NGCS) enabled IP-network. Legacy Network Gateway (LNG) is a Next Generation (NG) 9-1-1 and/or 1-1-2 Functional Element that provides an interface between a non-IP originating network and a Next Generation Core Services (NGCS) enabled IP network.

According to yet another preferred embodiment, before the step of prioritizing the call, the method can also include retrieving, by the PSAP or cloud server (cs), additional information and/or data from wearable service providers of abnormal or suspicious health statuses of users in proximity to the location information of the call.

A system for automatically prioritizing emergency calls based on health data can also be provided, wherein the system is adapted to perform one or more embodiments of the aforementioned method or other embodiment of the method that can be appreciated from the below text and discussed drawings.

According to yet another preferred embodiment, the system can be a communication system or communication apparatus that includes one or more of: an ESRP capable to receive emergency calls and to retrieve a location information for the calls, a PSAP configured to queue calls and to query a cloud server (cs), and a cloud server (cs) comprising abnormal health status data from people who wear a smart device.

The ESRP can be a computer device that includes a processor connected to non-transitory computer readable medium (e.g. a non-transitory memory) and at least one transceiver unit. The cloud server can also be a type of telecommunication device that can include a processor connected to non-transitory computer readable medium (e.g. a non-transitory memory) and at least one transceiver unit. The ESRP can also include at least one input device, at least one output device and/or at least one input/output device. Examples of such devices can include touch screens, printers, keyboards, buttons, or pointer devices. The ESRP can also be configured to form communicative connections with other devices (e.g. agent computer devices, cloud service devices, the PSAP, the cloud server, etc.). For instance, the ESRP can be communicatively connectable to the PSAP and/or the cloud server via a network connection, an internet connection, etc.

According to yet another aspect of the present invention, a program element is provided that can be stored in a non-transitory computer readable medium so that when it is executed by a processor of a device, the device is adapted to carry out steps of a method for prioritizing emergency calls from a server defined by code of the program element. Embodiments of such a method are discussed above.

According to another aspect of the present invention, a computer-readable medium having program code stored thereon is provided. The code can be stored so that it is executable by a processor of a computer device so that when it is executed by the processor, the device is adapted to carry out steps of the method for prioritizing emergency calls from a server. Embodiments of such a method are discussed above.

A non-transitory computer-readable medium may be, for example, a floppy disk, a hard disk, an USB (Universal Serial Bus) storage device, a solid state drive, a hard drive, a RAM (Random Access Memory), a ROM (Read Only Memory) or an EPROM (Erasable Programmable Read Only Memory).

It has also to be noted that aspects of the invention have been described with reference to different subject-matters. In particular, some aspects or embodiments have been described with reference to apparatus type claims whereas other aspects have been described with reference to method type claims. However, a person skilled in the art will gather from the above and the following description that, unless otherwise notified, in addition to any combination between features belonging to one type of subject-matter also any combination between features relating to different types of subject-matters is considered to be disclosed with this text. In particular, combinations between features relating to the apparatus type claims and features relating to the method type claims are considered to be disclosed.

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawings. It should be appreciated that like reference numbers can identify similar components.

Figure 1:
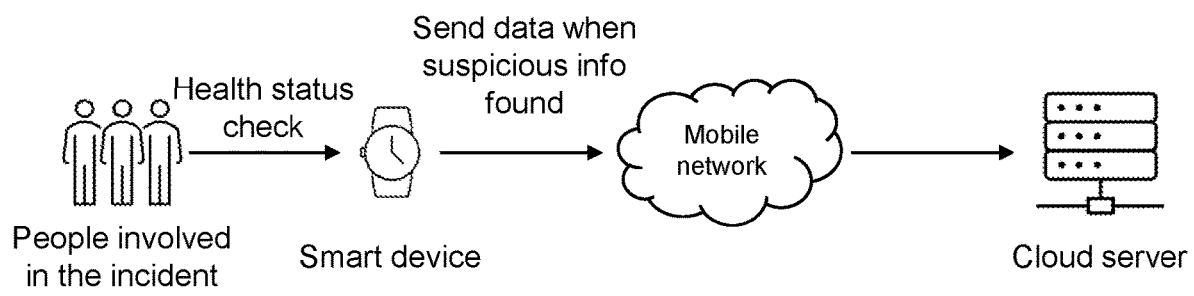
FIG. 1 shows a schematic illustration of storing suspicious medical data from smart devices to a server according to an embodiment of the invention.

The illustration in the drawings is schematic and may be not to scale. Reference numerals used in the drawings include:
LIS Location Information Server
LoST server Location-to-Service Translation server
ESRP Emergency Service Routing Proxy
GW Gateway
PSAP Public Safety Answering Point
SBC Session Border Controller
LNG Legacy Network Gateway
PIDF-LO Presence Information Data Format-Location Object
S100-S600 Method steps S100-S600
cs cloud server
ps prioritization value
pi precision index

DETAILED DESCRIPTION

Data from the smart watches or other smart devices worn by people or with people in an accident area can be stored in a cloud server (cs) that is only used to collect emergency data. This cloud server (cs) may be common for all emergency incidents and services in a country. In cases like a car accident where the pulse of one of the people involved and injured is abnormally low, or the temperature is very high (i.e. if a person sits next to a fire), etc., data that is picked by the medical device, e.g. a smart watch, is logged into the common cloud emergency space. This is illustrated in FIG. 1. People involved in an incident may wear a smart device which is able to monitor health data like pulse, blood oxygen level, body temperature, etc. The smart device can be a device of any kind that can collect health related information. For example, a smart watch, smart band, tablet, smart earphones, and the like. In FIG. 1 a smart watch is depicted which monitors the health parameters mentioned before. If these people wearing the smart watch are involved in an incident, the health parameter data may get abnormous or suspicious compared to usual health status. Only in this case, the smart device sends the abnormous data to a server via a network. The server can be a cloud server (cs) or any other kind of server capable to store the health status data of the smart device. In FIG. 1 a mobile network is shown, but any network like an open or secured WIFI etc. can work as well.

However, the mobile network corresponds to the cellular network where the mobile operator using its 4G and 5G abilities connects the device to the cloud server (cs) so that data can get collected. It should be mentioned that information which is to be send from the smart device is encrypted and secured. Only the emergency services employees can have access to this data to ensure privacy and country specific GDPR (General Data Protection Regulation) regulations.

The data is sent to the cloud server (cs) at the time something abnormal is identified from the smart medical device. This will ensure that only emergency-useful information will be stored in the server and will make filtering faster and more precise. For example, when low pulse is recognized then the location of the health device user and the 'issue' will be registered in the server. It should be mentioned that with 5G networks there is the ability to find location coordinates with an accuracy of approximately 1 m.

Figure 2:
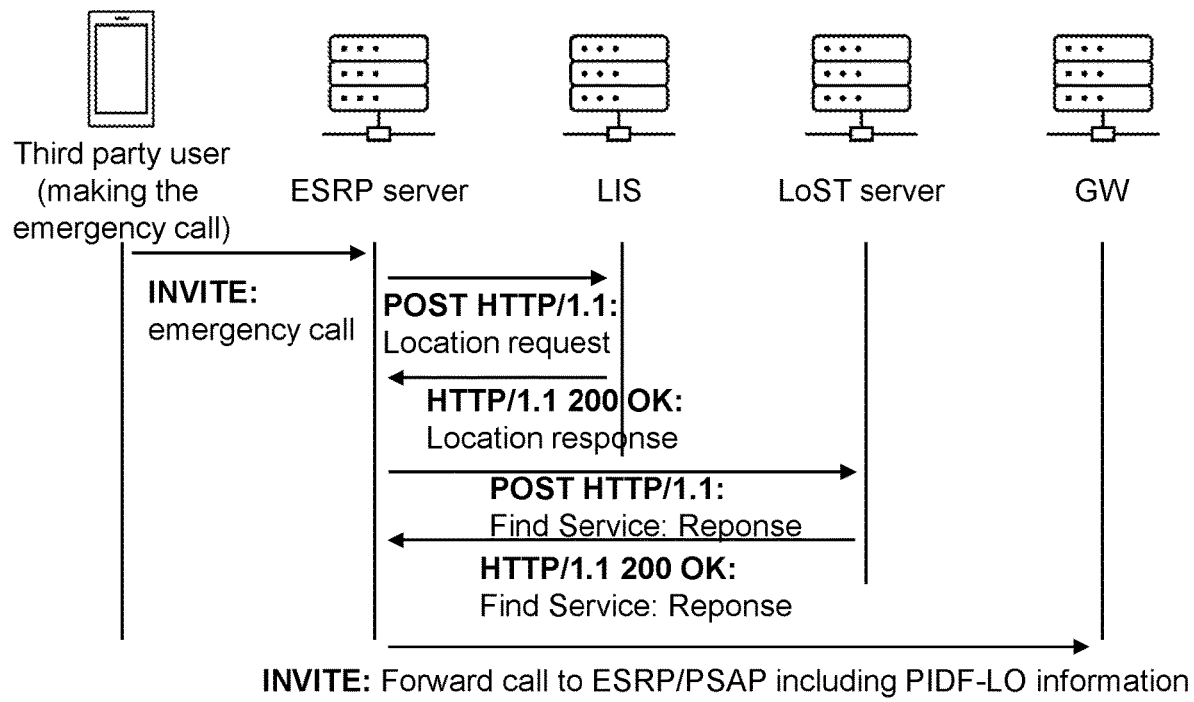
FIG. 2 shows in a schematic illustration the discovery process of the location and the route of the emergency caller according to another embodiment of the invention.

FIG. 2 depicts an exemplary process of a location discovery of the emergency caller. The actual emergency call can be placed by a third party via that party's phone or other type of calling device. A third party can be someone that has only seen the incident or has been aware of the incident but is not actually involved in the incident. At the time of the call the Public Safety Answering Point (PSAP) server immediately gets the location of the caller via querying the Emergency Services Routing Proxy (ESRP). FIG. 2 depicts the process of a location discovery from a Location Information Server (LIS). The LIS is a type of device that includes a processor connected to a non-transitory memory and at least one transceiver unit. The location discovery can include use of the HELD (HTTP-Enabled Location Discovery) protocol and HTTP POST messages. In more detail, upon making the call by the caller an INVITE message reaches the ESRP server. After that, a POST HTTP/1.1 message is sent to the LIS requesting the current location of the caller. The LIS confirms the requests of the ESRP server with a 200 OK message. Then, using a LoST server and the LoST (Location-to-Service Translation) protocol, the location requests are translated into a service. The LoST protocol is a protocol that takes location information and a Service URN and returns a URI. Uniform Resource Names (URNs) are intended to serve as persistent, location-independent, resource identifiers and are designed to make it easy to map other namespaces (which share the properties of URNs) into URN-space. Uniform Resource Identifier (URI) is an identifier consisting of a sequence of characters matching the syntax rule that is named <URI>. It enables uniform identification of resources via a set of naming schemes. A URI can be further classified as a locator, a name, or both. Used generally for location-based call routing. Location data is then forwarded to the PSAP server within an appropriate entry in the Presence Information Data Format Location Object (PIDF-LO). The PIDF-LO provides a flexible and versatile means to represent location information in a Session Initiation Protocol (SIP) header using an eXtensible Markup Language (XML) schema. This forwarding may comprise a gateway (GW) as depicted in FIGS. 2 and 3.

Figure 3:
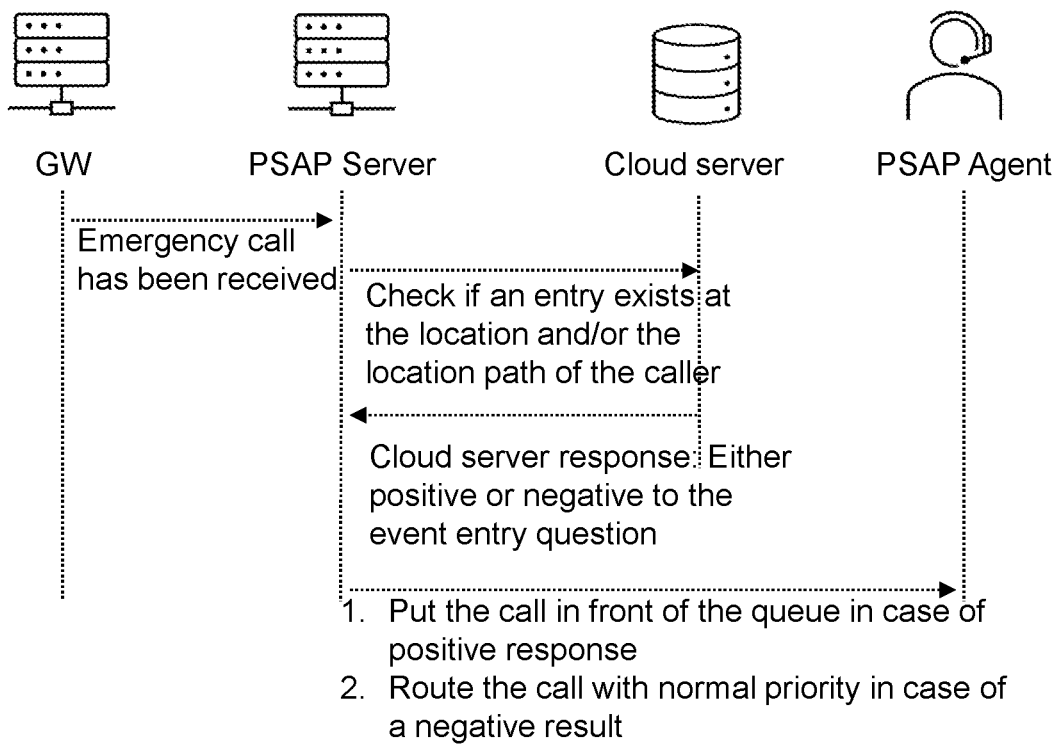
FIG. 3 shows in a schematic illustration the querying process of the PSAP for an event in a database at a location of the emergency caller according to another embodiment of the invention.
Figure 5:
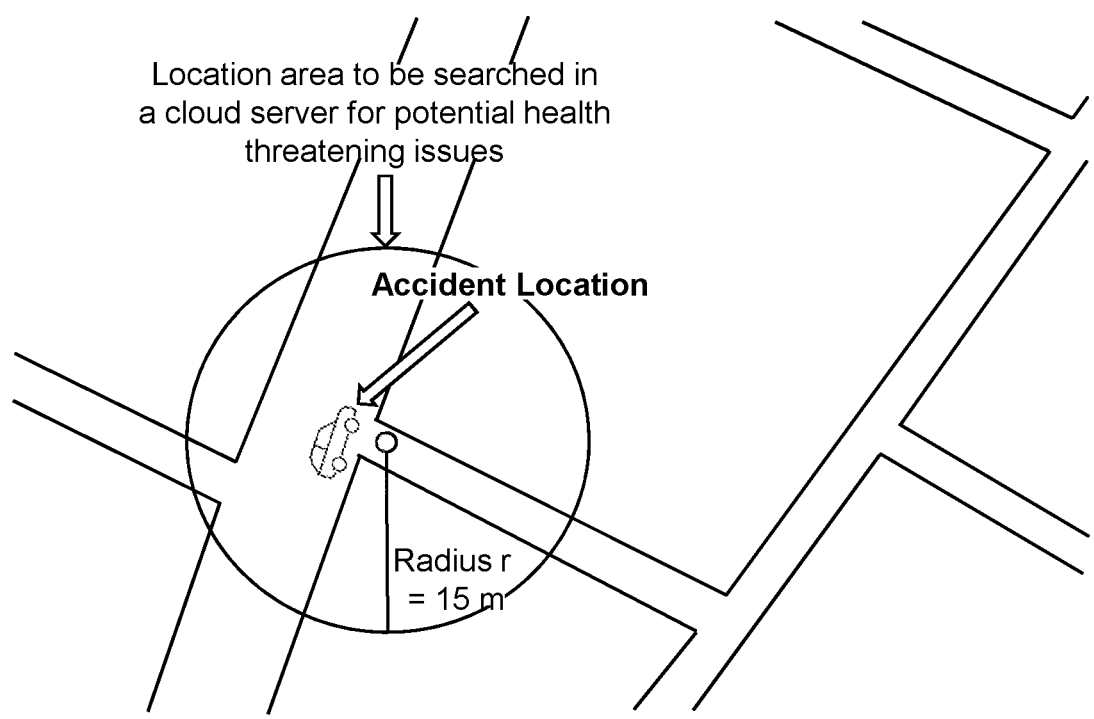
FIG. 5 shows a schematic illustration of an example of an area which the PSAP searches in the cloud database for abnormal health related entries according to another embodiment of the invention.
Figure 7:
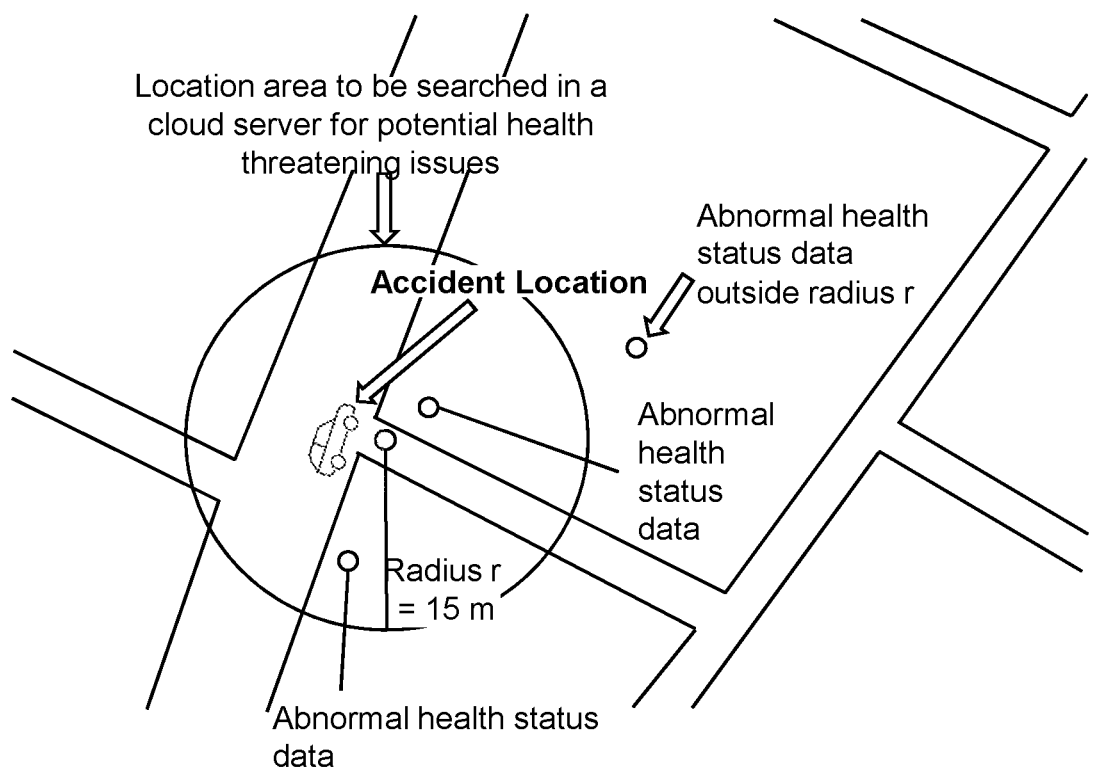
FIG. 7 shows a schematic illustration of an example of an area which the PSAP searches in the cloud database for abnormal health related entries according to another embodiment of the invention taking into account values outside the radius.

In FIG. 3, an exemplary querying process of the PSAP for an event in a database at a location of the emergency caller is depicted, once the current location of the caller from the LIS is retrieved by the PSAP. Therefore, the PSAP searches in the database of a cloud server (cs). This database comprises various entries of abnormal or suspicious health status data as it was described in detail in FIG. 1. The PSAP checks the database for any 'suspicious' entries near the location of the caller and/or along the location path of the caller in the case the caller's location has been updated various times. As FIG. 5 shows the search for any entries in the database is in this case can be performed using a radius of 10 m. However, the size of the radius can be adjusted according to the actual incident type and/or the geolocation or the terrain in which the incident occurred. The reason for doing so is to make sure that potential location discovery accuracy issues are considered and to ensure that the person performing the emergency call is really near the incident and not far away which lead to a false detection of the incident this person is calling for. For example, the radius should be larger if the caller is in an open terrain without urban structures and reports an incident, for example, smoke from a fire. On the other hand, the radius should be smaller if the caller is in a city and reports a traffic accident as an incident. For this reason, table 2 above shows some examples of the radius having default values according to example incident type-sets. However, any suspicious values in the cloud server (cs) which is larger than the above predefined radius can still be checked by the system but with a reduced confidence factor (see FIG. 7). For such cases, radius r numbers which are greater than these of values shown for example in table 2 have reduced confidence value (cv) e.g. 70% off normal cv. This influences the emergency call priority value as it is reduced by 7/10ths.

If the search by the PSAP returns positive results, then the emergency call can be assigned a prioritization value (ps). The prioritization value (ps) may have a number value between 0 and 1. Thereby, number "1" means abnormal health status data has been found and "0" means no abnormal data exists and this algorithm is terminated. Other embodiments can utilize other types of numerical valuation schemes (e.g. 0 meaning abnormal data and 1 meaning no abnormal data, etc.). The number may only be recognizable by the PSAP system and the PSAP agents via an entry in the agents' User Interface. The prioritization value (ps) can be used by the PSAP system to place the call at the front of the queue so that the next available agent answers. The caller will have no knowledge of the 'prioritization value (ps)' or the health status data since there is personal, e.g. health related data being involved. The caller is just placing the call for the event without knowing the process behind it and as stated above, without even knowing the condition of the people involved in the accident. The propagation of the prioritization value (ps) entry from the cloud server (cs) to the PSAP and the PSAP agents happens via Computer-supported telecommunications applications (CSTA) messages.

Figure 4:
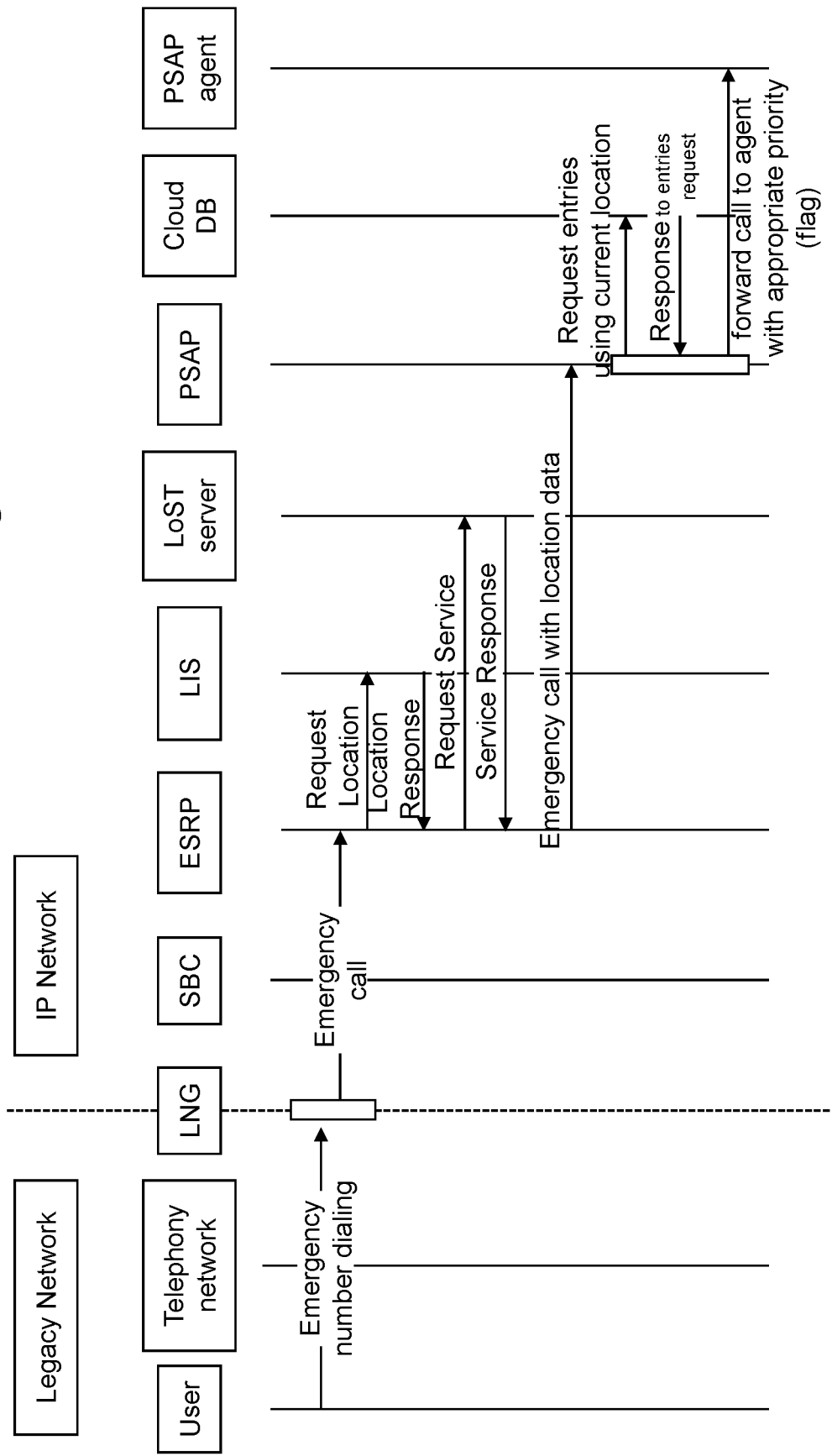
FIG. 4 shows in a network diagram the method for automatically prioritizing emergency calls based on health data according to another embodiment of the invention.

In FIG. 4 an embodiment of the method is illustrated in a network diagram. An emergency call by a third-party caller is shown that is reaching the Legacy Network Gateway (LNG) from a Legacy Network, for example, the mobile telephony network. The LNG is an NG 9-1-1 or NG 1-1-2 functional element that provides an interface between a non-IP originating network and a Next Generation Core Services (NGCS) enabled network. The NGCS is thereby the base set of services needed to process a 9-1-1 or 1-1-2 call. The emergency call is then transmitted by a Session Border Controller (SBC) to the ESRP server. The ESRP requesting location information, emergency service and then forwarding the call to the appropriate PSAP device. This has been shown in detail in FIG. 2. Then, the PSAP is doing a database search in the cloud server (cs), this has been shown in detail in FIG. 3. Finally, the call is transmitted to the queue of the PSAP with the appropriate prioritization value (ps) set, depending on the searched results and the next available agent picks up the call. Thereby, the call will be prioritized higher in the queue if there were abnormal health entries present in the database search for the area to be searched.

Figure 6:
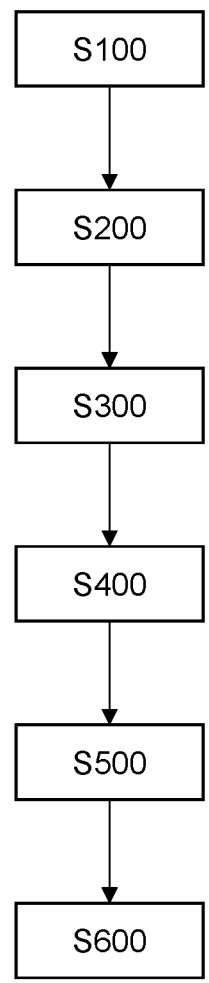
FIG. 6 shows a block diagram of the method according to another embodiment of the invention.

FIG. 6 is a block diagram of an exemplary method for automatically prioritizing emergency calls based on health data according to an embodiment of the invention is provided. At the beginning in step S100, an Emergency Service Routing Proxy (ESRP) receives an emergency call from a 3$^{rd}$ party caller who is not involved in an emergency incident to which the caller places the emergency call. In the next step S200, the ESRP retrieves a location information for the call. If no location information is available, the method ends, and the call is handled as a usual emergency call. After retrieving the location information, the ESRP forwards the call with the location information to a Public Service Answering Point (PSAP) in step S300. The PSAP queues the emergency call into its queue in step S400. In the next step S500 the PSAP queries a cloud database server which comprises stored health status data of people who wear a smart device by using the location information of the call. The smart device is configured to monitor these health status data. Finally, in step S600 the PSAP or the cloud database server prioritizes the emergency call in case abnormal health status data within the location of the call has been found from the query. Otherwise, if no health status data is found, the method ends, the call is not prioritized and is handled like a normal emergency call.

Today many people using wrist wearables or other wearable health monitor devices include sensors like heart rate, temperature, GPS etc. Other wearable devices (e.g. smart ear buds, etc.) can include one or more sensors that may provide useful health data. Many manufacturers, but also other service providers, can offer to save the "wearable" data on their server for later use. This data could also be used, in case of an emergency, to get more accurate information of the situation.

According to another embodiment of the invention, an application programming interface (API) for emergency purpose (e.g. ESINET, PSAP) is provided to get additional information about an emergency call carried out by a third person or eyewitness. Thereby, in a first step, an emergency call is placed by a caller to the emergency network. Then, location information of the caller is used to retrieve additional information/data from wearable device service providers of abnormal or suspicious health statuses of users. Thereby, potential abnormalities in the data like a low/high pulse were evaluated in a given time frame. This evaluation can be carried out by the service provider and/or by emergency network entities like the PSAP. In case, no critical data was recognized, but people in the proximity were detected, an information can be added to call and/or to inform the call taker. Otherwise, if no critical data was recognized and no people in the proximity were detected, the call can be handled like a default emergency call and no information is added. On the other hand, if an abnormality is detected in the analyzed data, the emergency call is directly prioritized higher.

Optionally, each third party call data or Manufacturer-specific service can have an assigned confidence value (cv), that will be considered as a weighting factor during the evaluation. The logic behind this is similar to the value set per smart watch model/make. For some examples table 3 below can be referred:

TABLE 3 example weighing factors

| Service to retrieve data from | Precision Index |
| --- | --- |
| Garmin connect | 1.00 |
| Fit bit | 0.99 |
| Strava (non- manufacturer specific, can be any smart watch) | 0.90 |

The confidence value can be based amongst other things on frequency (real-time upload) of data upload, GPS accuracy, accuracy of heart rate, etc. Also, a calculation of a hit rate could be used in form of a comparison between people actually at the scene of the emergency incident and people previously identified by service request.

It should be noted that the term "comprising" does not exclude other elements or steps and the "a" or "an" does not exclude a plurality. Further, elements described in association with different embodiments may be combined.

It should also be noted that reference signs in the claims shall not be construed as limiting the scope of the claims.

It should also be appreciated that different embodiments of the method, communication system, and communication apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, terminal device, a network, a server, a communication system, and methods of making and using the same have been shown and described above, it is to be distinctly understood that the invention is not limited thereto but may be otherwise variously embodied and practiced within the scope of the following claims.

What is claimed is:

1. A method for automatically prioritizing emergency calls based on health data, comprising:
   receiving an emergency call, by an Emergency Service Routing Proxy (ESRP), from a device of a caller who is not involved in an emergency incident to which the caller places the emergency call;
   retrieving, by the ESRP, a location information to the call;
   forwarding, by the ESRP, the call with the location information retrieved to a Public Service Answering Point (PSAP);
   queueing, by the PSAP, the emergency call into a queue;
   querying, by the PSAP, a cloud server with stored health status data of people who wear a smart device configured to monitor their health data by using the location information of the call; and
   prioritizing, by the PSAP, the emergency call in response to abnormal health status data within the location of the call being found in the query.

2. The method according to claim 1, wherein prioritizing includes assigning, by the PSAP or the cloud server, a prioritization value to the emergency call.

3. The method according to claim 2, wherein the prioritization value comprises a number value between 0.00 to 1.00 which is "1" or "0" if abnormal health status data have been found and the other of the "1" or "0" if no abnormal health status data have been found.

4. The method according to claim 2, further comprising:
   using a list of prioritization values related to all abnormal health statuses found.

5. The method according to claim 4, further comprising:
   determining and/or using a single prioritization value based on the list of prioritization values.

6. The method according to claim 2, further comprising raising the emergency call prioritization for the call based on the prioritization value.

7. The method according to claim 2, wherein Computer-supported telecommunications applications (CSTA) messages are used to propagate the prioritization value entry from the cloud serve to the PSAP.

8. The method of claim 1, wherein the smart device is one of a smart watch, a smart wristband, an earphone, a smartphone, a smart headband, smart glasses, a smart finger clip, a microcontroller with a sensor to measure health related data and/or a tablet or other devices with the ability to measure, collect and/or transmit the health related data.

9. The method of claim 1, wherein the retrieving of the location information further comprises:
   requesting, by the ESRP, the location information for a Location Information Server (LIS) using a POST HTTP message;
   confirming, by the LIS, the request to the ESRP with a 200 OK message;
   requesting, by the ESRP, a service from a Location to Service Translation, (LoST) server for the location information; and
   forwarding, by the ESRP the emergency call and the location information obtained by the LoST server using a Presence Information Data Format-Location Object (PIDF-LO) to the PSAP or another ESRP.

10. The method of claim 1, wherein the querying of the cloud server further comprises filtering, by the PSAP and/or the cloud server, the abnormal health status data entries for an area within a radius r based on the location of the caller and/or wherein the abnormal health status data entries outside the radius r are checked by the PSAP and/or the cloud server, but are assigned with a lower prioritization value.

11. The method according to claim 10, wherein the radius r depends on an emergency incident type and/or the size of the radius r is adjusted according to the actual incident type and/or a geolocation or the terrain in which the incident occurred.

12. The method of claim 1, wherein the emergency call originates from a Legacy Network passing a Legacy Network Gateway (LNG), and is received from a Next Generation Core Services (NGCS) enabled IP-network.

13. The method of claim 1, comprising:
   before the prioritizing of the call, retrieving, by the PSAP, additional information and/or data from wearable service providers of abnormal or suspicious health statuses of users in proximity to the location information of the call.

14. A system for automatically prioritizing emergency calls based on health data, the system comprising:
   an Emergency Service Routing Proxy (ESRP) configured to receive an emergency call from a device of a caller who is not involved in an emergency incident about which the caller places the emergency call, retrieve a location information to the call, and forward the call with the location information retrieved to a Public Service Answering Point (PSAP) such that the call is queueable by the PSAP in a queue
   a PSAP communicatively connectable to the ESPR, the PSAP configured to query a cloud server with stored health status data of people who wear a smart device configured to monitor their health data by using the location information of the call and prioritize the call in the queue in response to abnormal health status data within the location of the call being found in the query.

15. The system according to claim 14, wherein the system also comprises the cloud server.

* * * * *